H. S. TERRY.
HAND BUNDLE TIE.
APPLICATION FILED FEB. 21, 1918.
1,274,210.
Patented July 30, 1918.
4 SHEETS—SHEET 4.
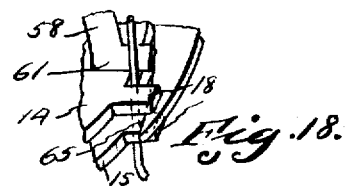
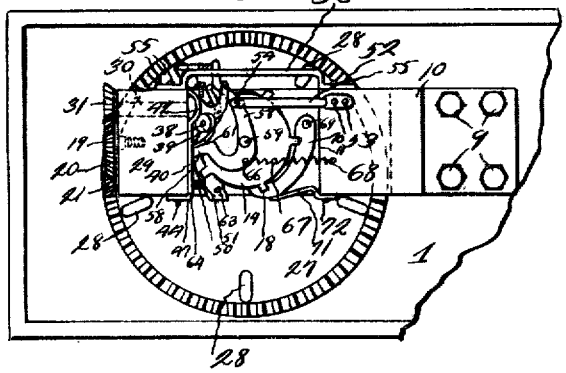
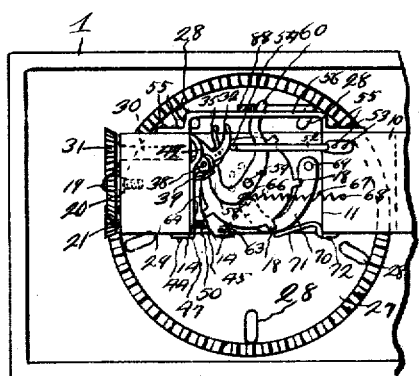
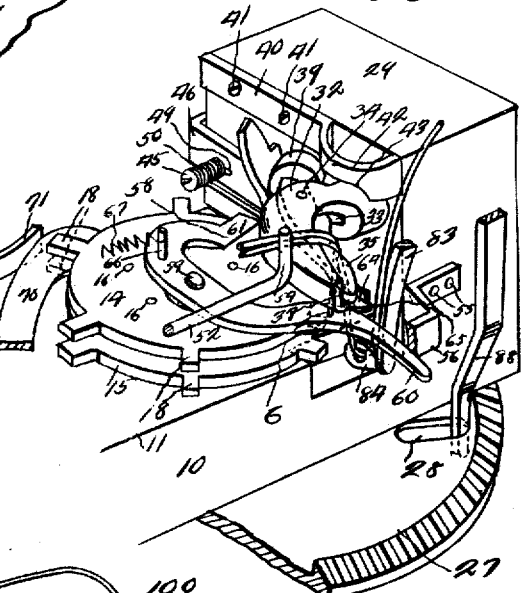
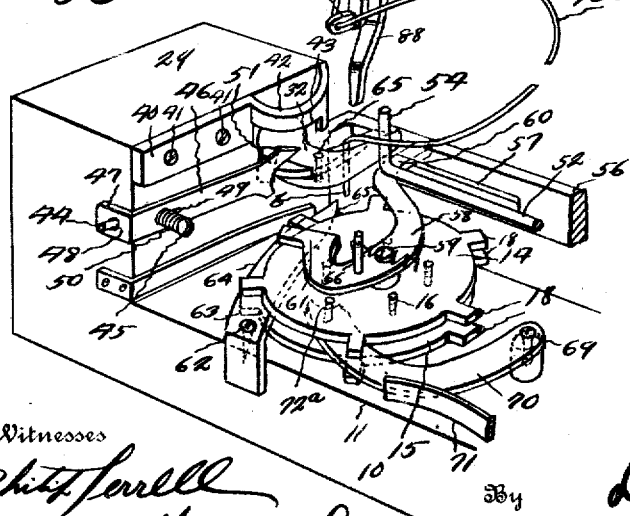
Inventor
H. S. Terry
Witnesses
By D. Swift & Co.
his Attorneys

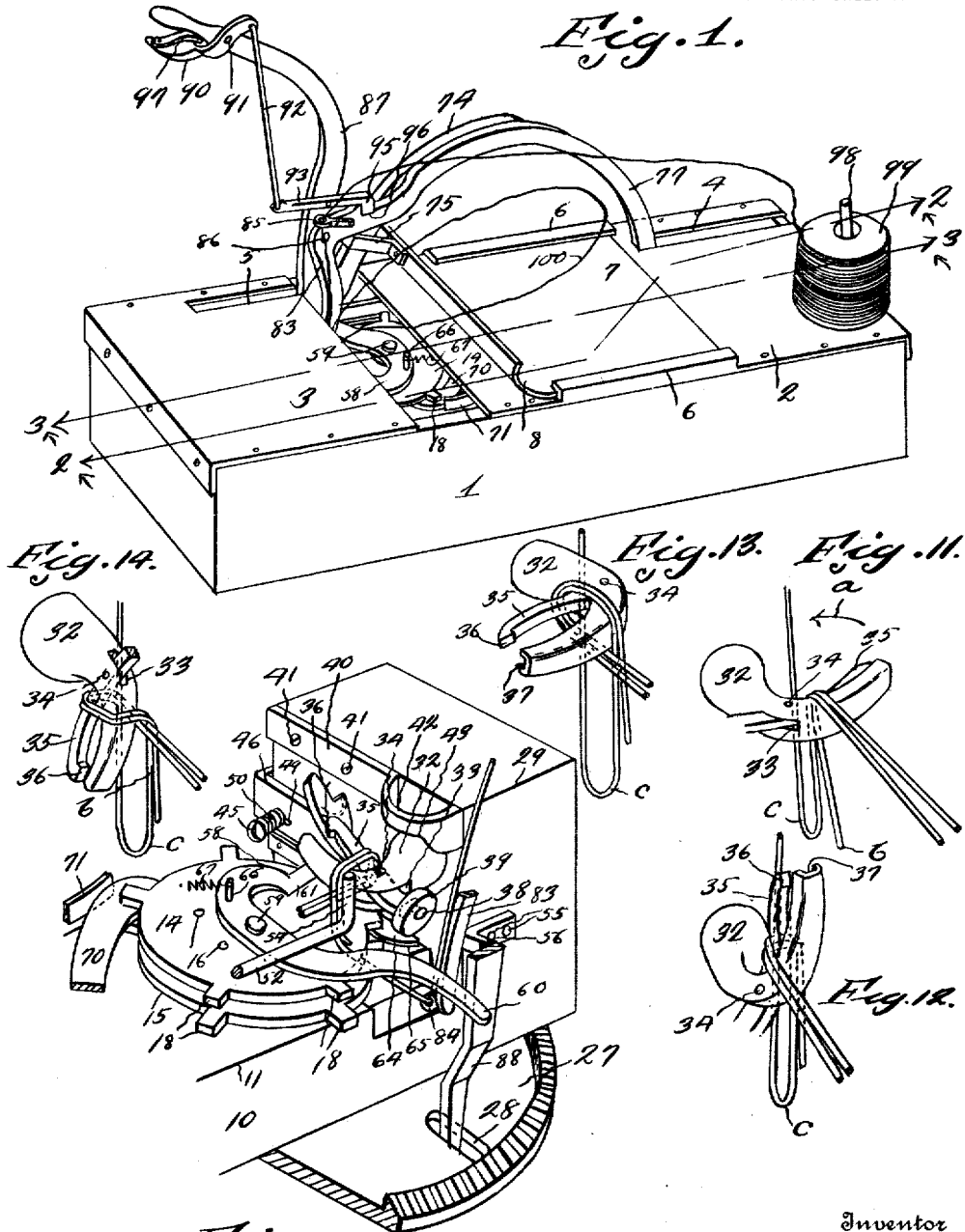

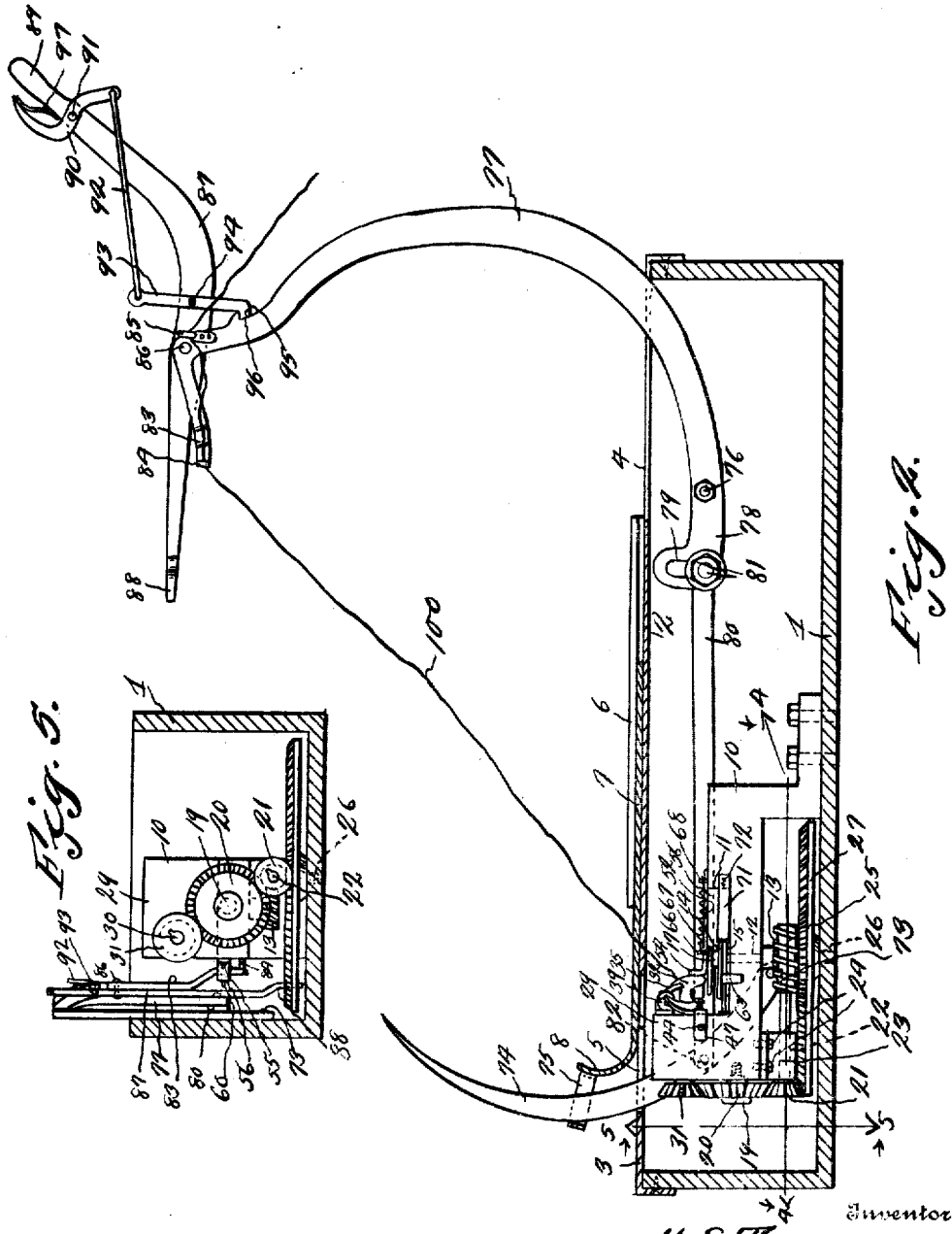

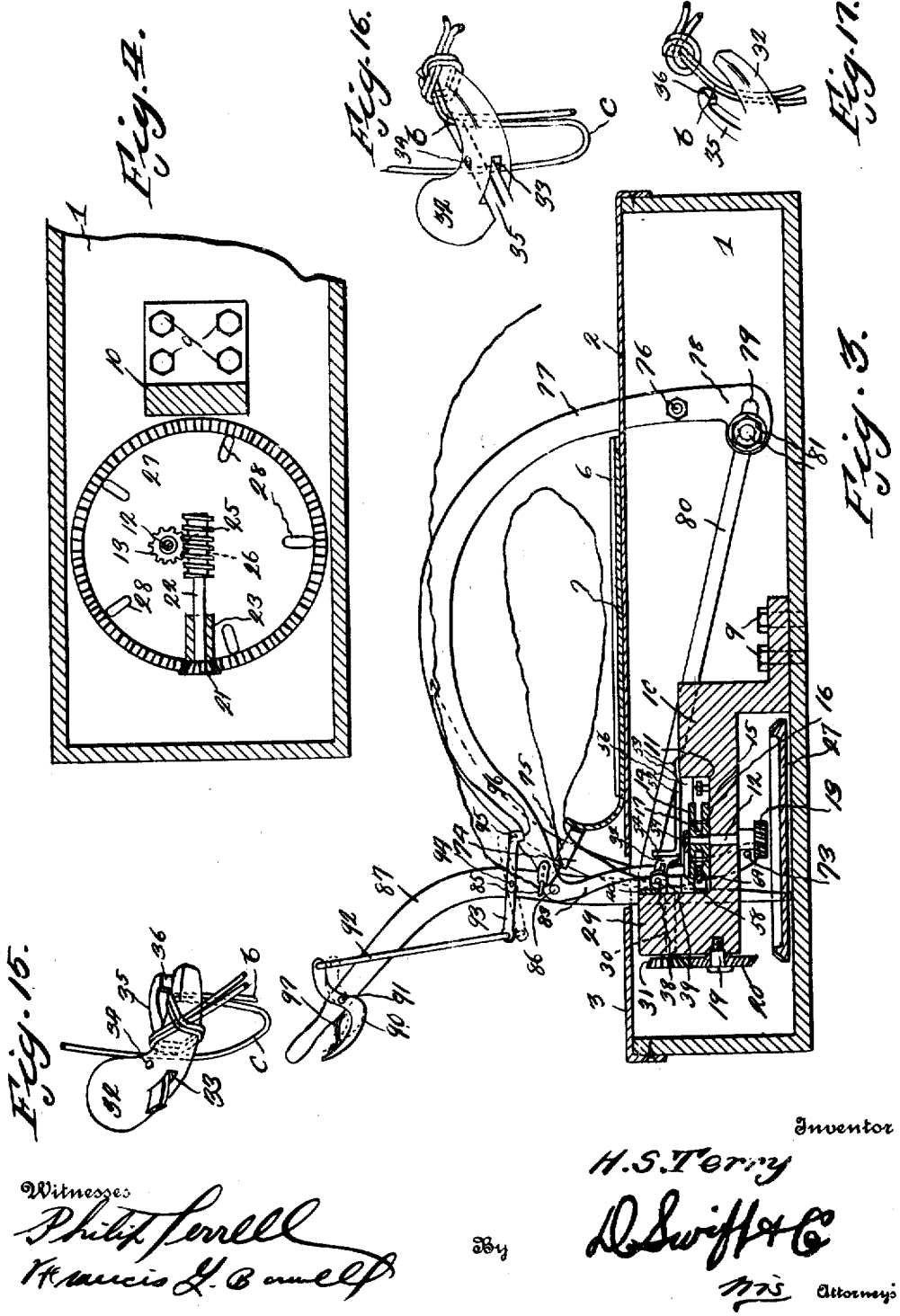

UNITED STATES PATENT OFFICE.

HARRY S. TERRY, OF COURTLAND, KANSAS.

HAND BUNDLE-TIE.

1,274,210.

Specification of Letters Patent.

Patented July 30, 1918.

Application filed February 21, 1918. Serial No. 218,476.

*To all whom it may concern:*

Be it known that I, HARRY S. TERRY, a citizen of the United States, residing at Courtland, in the county of Republic, State of Kansas, have invented a new and useful Hand Bundle-Tie; and I do hereby declare the following to be a full, clear, and exact description of the invention, such as will enable others skilled in the art to which it appertains to make and use the same.

This invention relates to a bundle tying machine, and one of the objects of the invention is to provide an improved machine of this kind which is hand operated, and being portable from one place to another, whereby bundles of corn stalks, wheat, hay and the like may be easily and quickly tied.

A further object of the invention is to provide a hand operated bundle tying device having means for drawing the bundle compacted and tight, while the binding cord or twine is looped around the bundle.

A further object of the invention is the provision of a pair of levers, both being curved for shaping the bundle when made compact and one lever being actuated by the other, which is manually operated, for bringing the bundle into compact form.

A further object of the invention is the provision of a needle at the terminus of one of the levers for bringing a looped end of the cord or twine toward and into a knotting mechanism.

A further object of the invention is to provide means for knotting the binding cord or twine subsequently to the cord or twine being passed about the bundle.

A further object of the invention is the provision of severing means for severing the cord or twine after knotting the same.

A further object of the invention is the provision of an oscillating member carried by one of the levers for imparting an intermittent motion to a gear disk, whereby a complete revolution may be imparted to the knotting mechanism for forming the knot.

A further object of the invention is the provision of means for bringing the cord or twine toward and to the severing means.

A further object of the invention is the provision of a detent for holding the means which brings the cord to the severing mechanism in its proper position.

In practical fields the details of construction may necessitate alterations falling within the scope of what is claimed.

The invention comprises further features and combination of parts as hereinafter set forth, shown in the drawings and claimed.

In the drawings:—

Figure 1 is a view in perspective of the improved hand operated bundle tying machine, constructed in accordance with the invention, and showing the bundle compacting levers closed.

Fig. 2 is a longitudinal sectional view on line 2—2 of Fig. 1 showing said levers open.

Fig. 3 is a longitudinal sectional view on line 3—3 of Fig. 1, showing the levers closed.

Fig. 4 is a sectional view on line 4—4 of Fig. 2.

Fig. 5 is a sectional view on line 5—5 of Fig. 2.

Fig. 6 is a plan view of a portion of the trough frame of the machine, showing the cover removed, and the knotting mechanism in plan.

Fig. 7 is a plan view similar to Fig. 6 showing the parts of the knotting mechanism in different positions.

Fig. 8 is an enlarged detail perspective view of the knotting mechanism showing the parts thereon in the same position as shown in Fig. 6.

Fig. 9 is an enlarged detail perspective view of the knotting mechanism illustrated at another angle to that shown in Fig. 8.

Fig. 10 is an enlarged detailed perspective view of the knotting mechanism taken at the same angle to that of Fig. 9, but showing the knot forming parts in different positions.

Fig. 11 is a view in perspective showing the first step in forming the knot in the binding cord or twine.

Fig. 12 is a perspective view showing the second step in forming the knot.

Fig. 13 is a perspective view of the third step in forming said knot.

Fig. 14 is a perspective view for showing the fourth step for tying the knot.

Fig. 15 is a perspective view showing the fifth step.

Fig. 16 is a perspective view illustrating the sixth step.

Fig. 17 is a perspective view showing the seventh and final step in completing the formation of the knot.

Fig. 18 is a perspective view of the parts for severing the binding cord or twine.

Referring more especially to the drawings 1 designates a trough shaped frame, which is rectangular, and secured to the upper edges of the sides and ends of said frame are two sections 2 and 3 of a cover, and which sections or plates are provided with elongated slots 4 and 5. The section or plate 2 adjacent its side edges is provided with overhanging L-shaped or angular flanges 6, constituting guides for the slide cover plate 7. One end of the slide cover plate 7 has a curved extension flange 8. Secured by suitable bolts 9 to the bottom of the frame is a bracket block 10 which may be any suitable construction, preferably angular shaped, as shown clearly in the drawings particularly Figs. 2 and 3. The upper part of the horizontal portion of the bracket is recessed transversely as shown at 11, and mounted in a bearing of a horizontal part is a shaft 12, on the lower end of which a worm wheel 13 is carried movably therewith. Fast with the upper end of said shaft are upper and lower disks 14 and 15 which are integral so as to rotate as one member. The hub collar 17 integrally connects the disks 14 and 15, so as to hold them spaced, but concentric with each other. These disks are provided with radial registering lugs or teeth 18, which act to bring the cord or twine toward the severing or cutting knife to be hereinafter set forth. Mounted upon a headed stud screw 19 (which is threaded into one end of the bracket block) is a bevel gear 20, which meshes with a bevel gear 21 on one end of the shaft 22, which is mounted in a bearing plate or bracket 23 secured by bolts 24 to the under part of one end of said bracket block. The other end of the shaft 23 has a worm 25 meshing with the worm wheel 13, whereby motion may be imparted to the shaft 12 and the disks on its upper end. Mounted upon a screw stud 26 (which is carried by the bottom of the frame) is a large bevel gear 27, which is engaged by the bevel gear 21. The bevel gear 27 is provided with a plurality of radial slots 28. Mounted in a suitable bearing of the upstanding part 29 of the bracket block is a shaft 30, on one end of which a bevel gear 31 is made fast thereto. The other end of the shaft 30 carries a curved knot tying horn 32 which is provided with an elongated slot 33. Pivotally mounted in the slot 33 and on the pin 34 is a lever or oscillatory member 35. One end portion of the lever 35 is provided with a lateral tooth 36. One face of the knot tying horn has an elongated recess 37 for the reception of the tooth 36 and partial reception of one end portion of said lever 35, that is, when the end carrying the tooth 36 is closed. The other end of the lever or member 35 has an extension 38, which carries a disk roller 39. A metal strap 40 is secured by screws 41 to the upstanding part 29 of the bracket block, and one end of this metal strap is formed into a substantially semicircular cam arch 42, the lower part of which is cut away as shown at 43 to admit of the location of the body of the knot forming horn. Extending laterally from one of the faces of the upstanding part 29 of said bracket block is a lug 44 and projecting from an adjacent face of said part 29 is a screw stud 45. An angle plate 46, better shown in Figs. 8, 9 and 10 is provided, and its angle end 47 has an opening 48 for the reception of the stud 44, while its body has an elongated slot 49, through which the screw stud 45 engages. A coil spring 50 is interposed between the head of the screw stud 45 and said plate 46. Owing to the opening 48 being larger than the stud 44 and owing to the provision of the slot 49, the plate 46 is permitted to have a slight oscillatory movement which is essentially necessary as will be hereinafter pointed out. One end of the plate 46 terminates in an extension cam, which extends approximately vertically and slightly laterally, and at an acute angle to one face of the upstanding part 29 of the bracket block. As the shaft 30 rotates, and the knot forming horn therewith, the roller or wheel 39 first cams on the extension cam 51 (the lever 35 having previously opened through the medium of gravitation) thereby closing the lever 35, after which the roller or wheel 39 cams against the arch 42, which will open the lever 35. When the lever 35 opens at this point the cord or twine is released, the knot having been formed, and the formation of which will be hereinafter set forth. An arm 52 is secured at 53 to the upper face of one end of the bracket block. This arm 52 has a right angle upstanding finger 54, acting as a guard to keep the twine or cord in position on the horn. Secured to one side of the bracket block as at 55 is an arch plate 56 having a slot 57. A suitable knife 58 is pivotally mounted on an extension 59 of the upper end of the shaft 12, this knife or severing member is provided with a substantially compound curved extension portion 60 extending through the slot 57 of the arch plate. The severing portion 61 of the knife extends laterally from the body of the knife, so as to be radial from the pivot of the knife, whereby, as the knife is oscillated, the cutting edge of the severing portion will assume a position radially with relation to the lugs 18 of the disks 15 and 14, so as to sever the cord or twine. Secured by a screw stud 62 to the bracket block is an angle plate 63, the body portion 64 of which extends between the spaced disks 14 and 15. The body 64 of this plate is tapered at one end, and so disposed that the edge 65 will assume a position at an acute angle to the marginal or peripheral edges of the disks 14 and 15, thereby constituting a holder, to prevent the cord or twine, as it is being brought toward the knife by one pair of the lugs 18, from slipping out of position, or out of contact with the lugs. A lug 66 extends vertically upwardly from the body of the knife, and connected to the lugs is one end of the spring 67. The other end of the spring 67 is secured to a pin 68 on the upper face of one end of the bracket block. By means of the spring 67 the knife is returned to its normal position after having been once operated. Pivotally mounted upon a screw stud 69 of the transverse recess of the bracket block is a lever 70, which is curved so as to extend between the disks 14 and 15. A suitable spring 71, which is secured at 72 to the bracket block, bears against the edge of the lever 70, so as to hold the notched end 72ª of said lever in engagement with anyone of the several rivets or pins 16 which secure the disks 14 and 15 together. The disks 14 and 15 are given intermittent motions, one sixth movement at a time and since the pins 16 are disposed so that one at a time will engage the notched end of the lever 70 intermittently, the lugs 18 cannot move farther than would be required for the cutting edge to sever the cord or twine. Pivoted at 73 to the inner face of one of the longitudinal sides of the frame is a curved lever 74, which extends through a looped strap 75 of the extension flange 8 of the slide cover 7. Pivoted upon a bolt 76 of the inner face of one of the sides of the frame is a lever 77, the enlarged end 78 of which has an elongated slot 79. A link 80 is connected to the slotted end of the lever 77 by means of the bolt and nut connection 81. The link is in turn pivoted at 82 to the curved lever 74. This lever 77 is so curved as to arch over a bundle of corn stalks or the like, when the lever 77 is closed as illustrated in Fig. 3, so as to draw the bundle compact. The lever 74 will also be actuated by the movement of the lever 77, to extend or overlie the bundle. The lever 77 at its free end terminates in substantially a right angle extending portion 83 constituting a needle which is provided with a lateral eyed portion 84. An eye 85 is secured on the side of the lever 77 near where the portion 83 extends laterally. Pivoted on a screw stud 86 of the lever 77 is an oscillatory member or lever 87, the end portion 88 of which is designed to engage anyone of the radial slots 28 of the spur gear 27, so that when the lever 87 is oscillated or tilted an intermittent motion may be imparted to the bevel gear 27. The lever 87 has a handle, adjacent which a hand grip lever 90 is pivoted at 91. One end of the hand grip lever 90 has a link 92 pivoted to it. This link is in turn pivoted to one end of a dog 93, which is pivoted on a pivot stud 94. The nose 95 of the dog is designed to engage a notch 96 of the lever 77, to hold the lever 87 in the position shown clearly in Fig. 2. The hand grip lever is under tension of the spring 97. In tying a bundle the cord or twine (a ball 99 of which is mounted upon a stud 98) is passed through the eye 85, and then through the eye of the needle, and the end of the cord is laid across the knot tying horn and the lever 35, as shown clearly in Fig. 8, thereby forming a loop 100 as shown and in which loop a bundle of corn-stalks, hay, wheat or the like is placed, to be tied. The lever 77 is then moved, and the same in turn actuates the lever 74, the two levers 74 and 77 then assume positions as shown in Fig. 3, thereby compacting or forming the bundle. However, when the levers 74 and 77 are open as shown in Fig. 2, the cover plate 7 is drawn over the space between the adjacent edges of the plate sections 2 and 3 of the frame, thereby preventing excessive dust and dirt from contacting with the knotting mechanism within the frame. When the levers 74 and 77 are moved to the positions shown in Fig. 3, the plate 7 is moved to uncover the space between the adjacent edges of the plate sections 2 and 3. When the plate 7 is so moved, the flange 8 assists in packing the bundle. It is to be observed that when the levers 74 and 77 assume the positions shown in Fig. 3, the extremity 88 of the lever 87 may engage one of the slots 28 of the gear 27 and then by releasing the dog 93, by operating the hand grip, the lever 87 is free to be oscillated. In tying the bundle, the cord is laid on the knotting horn 32 as shown in Fig. 8, and when the lever 77 is moved to the position as shown in Fig. 3, the eye of the needle portion of the lever 77 positions the loop of the cord or twine in the position shown in Fig. 9. The cord or twine is then ready to be formed into a knot, and when the lever 87 is given an oscillatory movement, a partial turn, for example about a fifth of a revolution, is imparted to the gear 27, which in turn through the medium of the beveled gears 20, 21 and 31, imparts a complete revolution to the knotting horn, whereby the same will form the two adjacent parts of the cord or twine into a knot of the kind shown in Fig. 17. However, Figs. 11 to 17 disclose the different stages of the positions of the parallel parts of the cord or twine during the formation of the knot and these different stages are set forth as follows, beginning with Fig. 11: The horn as shown in Fig. 11 turns in the direction of the arrow a, and when the same has made a half revolution from Fig. 11 to Fig. 13 inclusive, the adjacent parts of the thread or cord are formed into a loop. When the horn reaches the position shown in Fig. 13 the lever 35 has opened, so that when the knotting horn makes a further movement, say for instance about a quarter of a revolution, the two parts of the cord or twine as indicated at b are gripped between the lever 35 and the horn, as illustrated in Fig. 15, the knotting horn having made its further and substantially final quarter of a revolution. However, when the horn completes its full revoluble movement, the lever 35 becomes closed, by reason of the roller 39 engaging the extension cam 51, and the loop (through which the adjacent gripped portions b of the twine or cord have been drawn) is in the act of slipping off the knotting horn, thereby forming the knot as shown in Fig. 17, which shows the adjacent portions b in the act of being released. Just prior to releasing the parts b of the cord or twine, the lugs 18 of the disks 14 and 15 (which have been rotated substantially a sixth of a revolution) carry the thread or twine near the loop c toward the cutting edges of the severing knife. The cutting knife is in turn oscillated against the action of its spring 67, by the lever 87 engaging the extension 60 of the knife, whereby the cutting edge of the knife is brought toward the cord or twine, the guard 64 acting to hold the cord or twine adjacent the lugs 18 of the disks 14 and 15. In order to actuate the knife 58, the lever 87 is moved upon its pivot, so that its lower portion just a short distance above its extremity 88 will contact with the extension 60 of the knife, which will actuate the knife on its pivot 59, and bring the cutting edge or portion 61 of the knife toward the twine or cord, whereby it may be severed. As the cutting edge of the knife and the lugs approach toward each other, the cord or twine is severed, the cutting edge preforming a shearing action adjacent the upper face of the disk 14. Bundles of corn stalks and the like may be consecutively tied, by consecutively performing the above cycle of operation.

The invention having been set forth what is claimed as new and useful is:—

1. In a machine as set forth, a frame, a pair of oscillatory bundle compacting members, one having connections with and operating the other, a knotting mechanism having a knotting horn, and means carried by one of the members engaging an element of the knotting mechanism for imparting a complete revolution to the knotting horn.

2. In a machine as set forth, a frame, a pair of oscillatory bundle compacting members, one having connections with and operating the other, a knotting mechanism, and means carried by one of said members to engage and operate an element of said mechanism for operating the knotting mechanism.

3. In a machine as set forth, a frame, a pair of oscillatory bundle compacting members, one having connections with and operating the other, a knotting mechanism, and means carried by one of said members to engage and operate an element of said mechanism for operating the knotting mechanism, and a detent dog for holding said means from being operated.

4. In a machine as set forth, a frame, a pair of curved levers pivotally mounted on said frame and one having a linked connection with and operating the other, whereby said levers may compact a bundle of stalks, and a slide mounted in guides of said frame and connected to one lever to assist in compacting the stalks.

5. In a machine as set forth, a frame, a pair of curved levers pivotally mounted on said frame, and one having a linked connection with and operating the other, whereby said levers may compact a bundle of stalks, a knotting mechanism having a knotting horn, whereby a thread which is passed about the bundle, may be formed into a knot, one of said levers having a needle portion and an eye for conveying a loop of the thread toward and to the knotting horn, and means carried by one of said levers to engage an element of said mechanism for operating the knotting horn.

6. In a machine as set forth, a frame, a pair of oscillatory bundle compacting members, one having connections with and operating the other, and a slide mounted in guides of said frame and having an extension flange connected to one of said members, whereby the bundle may be additionally compacted.

7. In a machine as set forth, a frame, bundle compacting means thereon, a knotting mechanism having a major operating element therefor and a knotting horn, and a device carried by the compacting means and engaging said element for operating said mechanism, whereby a complete revolution may be imparted to the knotting horn.

8. In a machine as set forth, a frame, bundle compacting means thereon, a knotting mechanism having a major operating element therefor and a knotting horn, and a device carried by the compacting means and engaging said element for operating said mechanism, whereby a complete revolution may be imparted to the knotting horn, and a severing member operated by said device for severing the cord or twine subsequently to being knotted.

9. In a machine as set forth, a frame, bundle compacting means thereon, a knotting mechanism having a major operating element therefor and a knotting horn, and a device carried by the compacting means and engaging said element for operating said mechanism whereby a complete revolution may be imparted to the knotting horn, and a severing member operated by said device for severing the cord or twine subsequently to being knotted, and means actuated by said major element for carrying the thread or cord toward the severing member.

10. In a machine as set forth, a frame, bundle compacting means thereon, a knotting mechanism having a major element therefor and a knotting horn, and a device carried by the compacting means and engaging said element for operating said mechanism, whereby a complete revolution may be imparted to the knotting horn, a lever carried by the knotting horn between which and the horn the cord may be gripped, the roller carried by said lever, and a pair of camming devices with first one and then the other of which the roller engages for opening and closing said lever during the revolution of the knotting horn.

11. In a knotting device, a support, a shaft mounted therein and provided with a knotting horn, a gear mechanism geared to said shaft and provided with a major gear, said major gear having radial slots, and an oscillatory member to engage said slots to impart an intermittent motion to the major gear, whereby a complete revolution is given the knotting horn.

12. In a knotting device, a support, a shaft mounted therein and provided with a knotting horn, a gear mechanism geared to said shaft and provided with a major gear, said major gear having radial slots, and an oscillatory member to engage said slots to impart an intermittent motion to the major gear, whereby a complete revolution is given the knotting horn, a lever carried by the knotting horn, between which and the horn a cord may be gripped, said lever having a roller at one end, and a pair of camming devices with first one and then the other of which said roller engages for opening and closing said lever.

13. In combination with a device for knotting a thread, a spring tensioned thread severing member, a lever for oscillating said member, means geared to and oscillated by the knotting device for carrying the thread toward the severing member, and means coöperating with the carrying means for guarding and holding the thread in position to be severed.

In testimony whereof I have signed my name to this specification in the presence of two subscribing witnesses.

HARRY S. TERRY.

Witnesses:
F. O. JOHNSON,
OLIVER JOHNSON.

Copies of this patent may be obtained for five cents each, by addressing the "Commissioner of Patents, Washington, D. C."